(12) United States Patent
Maccarrone

(10) Patent No.: US 9,869,271 B2
(45) Date of Patent: Jan. 16, 2018

(54) CYLINDER HEAD GASKET

(71) Applicant: GM GLOBAL TECHNOLOGY OPERATIONS LLC, Detroit, MI (US)

(72) Inventor: Domenico Maccarrone, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 14/957,691

(22) Filed: Dec. 3, 2015

(65) Prior Publication Data

US 2016/0160794 A1    Jun. 9, 2016

(30) Foreign Application Priority Data

Dec. 3, 2014 (GB) .................................. 1421480.3

(51) Int. Cl.
*F02F 11/00* (2006.01)
*F16J 15/08* (2006.01)
*F02F 1/24* (2006.01)

(52) U.S. Cl.
CPC .............. *F02F 11/002* (2013.01); *F02F 1/24* (2013.01); *F16J 15/0818* (2013.01); *F16J 15/0825* (2013.01); *F16J 2015/0875* (2013.01)

(58) Field of Classification Search
CPC ........ F02F 11/002; F02F 1/24; F02F 2200/00; F16J 15/0818; F16J 2015/0875; F16J 15/0825; F16J 15/08
See application file for complete search history.

(56) References Cited

U.S. PATENT DOCUMENTS

| | | | |
|---|---|---|---|
| 6,148,516 | A | 11/2000 | Diez et al. |
| 7,909,337 | B2 | 3/2011 | Ueta et al. |
| 2003/0042689 | A1 | 3/2003 | Diez et al. |
| 2004/0012455 | A1 | 1/2004 | Shibayama et al. |
| 2008/0048402 | A1 | 2/2008 | Sailer et al. |

FOREIGN PATENT DOCUMENTS

| | | |
|---|---|---|
| DE | 19928602 A1 | 1/2001 |
| DE | 102005039060 A1 | 3/2007 |
| EP | 0939256 A1 | 9/1999 |

OTHER PUBLICATIONS

Great Britain Patent Office, Great Britain Search Report for Great Britain Application No. 1421480.3, dated May 15, 2015.

*Primary Examiner* — Syed O Hasan
(74) *Attorney, Agent, or Firm* — Lorenz & Kopf LLP

(57) ABSTRACT

A cylinder head gasket including a stack of layers that includes a first functional layer having an embossed first sealing full bead and a first stopper, a second functional layer having an embossed second sealing full bead, and a carrier layer having an embossed carrier layer full bead. The first sealing full bead and the second sealing full bead are mutually superimposed. The carrier layer full bead and the first stopper are mutually superimposed. The carrier layer full bead when it is fully compressed has a maximum line load range included between 75 and 125 N/mm and assumes a flat configuration.

11 Claims, 2 Drawing Sheets

CYLINDER HEAD GASKET

CROSS-REFERENCE TO RELATED APPLICATION

This application claims priority to Great Britain Patent Application No. 1421480.3, filed Dec. 3, 2014, which is incorporated herein by reference in its entirety.

TECHNICAL FIELD

The present disclosure pertains to a cylinder head gasket for an internal combustion engine, in particular for a diesel engine.

BACKGROUND

It is known that an internal combustion engine usually includes a cylinder head gasket, which is interposed between a cylinder head and an engine block, to seal the perimeter of the combustion chambers and of the coolant passages extending from the engine block to the cylinder head. Each combustion chamber is generally defined by an engine cylinder block, together with the top of the piston accommodated therein and a part of the cylinder head facing the piston.

As a consequence, the inner volume of the combustion chamber changes cyclically in response to the movement of the piston within the cylinder. During the movement of the piston, the pressure inside the chamber changes too. It reaches a maximum value when the fuel is ignited (maximum peak firing pressure), while it remains at lower values during the other phases of the engine cycle.

This cyclical variation of the combustion chamber inner pressure changes the gap between the cylinder head and the cylinder block. Therefore, the cylinder head gasket is subjected to pressure changes and must have permanent gap recovery capability in order to maintain satisfactory sealing-off.

The cylinder head gasket includes a stack of superimposed spring metal layers. Half and Full beads are usually provided on some of the spring-metal layers (then called functional layers) to obtain the required permanent sealing pressure. Moreover, a limiter (or stopper) protects the beads running around the respective combustion-chamber perimeter in order to make them work within a proper range of effective load. The stopper rests along the combustion-chamber edge and limits the beads closure, which follows the relative movements of the cylinder head with respect to the cylinder block (gap).

The stopper can prevents the beads from being pressed flat by the cylinder head bolts load, as it forms relief of the cylinder-head gasket, which extends along each combustion-chamber edge. In the region of the stopper, very high line load occurs due to the force exerted by the bolts, in absence of any gap between the engine block and the cylinder head. During combustion instead, the region of the stopper is typically relieved, at least momentarily, due to the pressure inside the combustion chamber that contrasts the force exerted by the bolts. This leads to high stress amplitudes in this region.

In high-performance engines, especially diesel engines, it is possible that, during maximum peak firing pressure, contact is lost in the combustion chamber perimeter sealing land and a gap between layers is formed. When contact is lost in the region of the stopper, hot combustion gases can pass, unimpeded, as far as the actual sealing-off point, which is formed by the spring-steel beads. As a result, because of the high temperature/high pressure of the combustion gases, the spring property of the bead is compromised and therefore its sealing action may be diminished.

DE10143431-A1 describes a metallic cylinder head gasket for an internal combustion engine including a cylinder block provided with adjacent combustion chambers and a cylinder head screwed to the cylinder block. The cylinder-head gasket includes two essentially planar functional layers consisting of elastic metal, in particular spring steel, between which a carrier layer made of sheet steel is arranged. On every functional layer, a full bead is provided around each combustion-chamber edge. The bead of each layer faces the other with their vertices. The beads closure is limited by at least one static stopper arranged concentrically to the respective bead.

In the region of the stopper, a support element built as a half-bead or a full-bead is provided. The support element overlies the stopper, and cannot be pressed flat. The force applied by the support element that rests directly on the stopper is in the range of about 30 to 60 N/mm under the engine operating condition (maximum peak firing pressure).

The above technology, applied to high performance engines and especially to diesel engines with aluminum cylinder block and cylinder liners, may still allow the passage of hot combustion gasses through the first sealing region of the gasket. In fact, damage of the gasket due to the leak of high temperature gas was verified (typically bore to bore), together with contamination of exhaust gasses in coolant. Moreover the support element provided on the carrier layer becomes easily damaged due to the high mechanical stress acting on it, caused by the force exerted by the cylinder head bolts.

SUMMARY

The present disclosure provides a cylinder head gasket that minimizes or prevents the gas leakage from the combustion chamber, especially during the peak of pressure in the combustion phase (maximum peak firing pressure). In particular, an embodiment of the present disclosure provides a cylinder head gasket including a stack of layers having a first functional layer including an embossed first sealing full bead and a first stopper, a second functional layer including an embossed second sealing full bead, and a carrier layer including an embossed carrier layer full bead. The first sealing full bead and the second sealing full bead are mutually superimposed. The carrier layer full bead and the first stopper are mutually superimposed. The carrier layer full bead, when it is fully compressed, has a maximum line load range included between 75 and 125 N/mm and assumes a flat configuration.

This gives the effect of minimizing or preventing the gas leakage from the combustion chamber, especially during the peak of pressure inside the cylinder. The full bead present on the carrier layer is able to give a relevant spring force, also when no load on stopper is applied. This helps to seal the gap immediately after its formation in the combustion chamber perimeter.

According to an aspect of the present disclosure, a convex portion of the first sealing full bead faces a convex portion of the second sealing full bead. This aspect of the present disclosure gives the effect of further improving the sealing performance of the gasket.

According to an aspect of the present disclosure, the wherein the carrier layer full bead, at minimum load conditions, has a maximum line load range lower than 30 N/mm.

This aspect of the present disclosure helps to avoid severe stress on the carrier layer full bead, also under the minimum load condition.

According to an aspect of the present disclosure, the second functional layer is positioned between the first functional layer having the stopper and the carrier layer. This aspect of the present disclosure gives the effect to protect of the carrier layer bead, because it is not directly exposed to the stopper load.

According to another aspect of the present disclosure, the second functional layer is free from any stoppers. This aspect of the present disclosure gives the effect that the second functional layer distributes homogeneously the load acting on the carrier layer bead during different engine cycle phases.

According to another aspect of the present disclosure, the superimposed layers include a third functional layer having an embossed third sealing full bead, and a fourth functional layer having an embossed fourth sealing full bead and a second stopper, wherein the third and fourth functional layers are positioned so that a convex portion of the third sealing full bead faces a convex portion of the fourth sealing full bead and the second stopper faces the first stopper. This aspect of the present disclosure gives the advantage of providing a very efficient sealing gasket due to the presence of four full beads on the functional layers. Furthermore the configuration gives a homogeneous load distribution from layer to layer, without shear stress in the layer planes.

According to another aspect of the present disclosure, the third functional layer is positioned between the carrier layer and the fourth functional layer. This aspect of the present disclosure gives the advantage to protect of the carrier layer bead, because it is not directly exposed to the stoppers load.

According to another aspect of the present disclosure, the third functional layer is free from any stoppers. This aspect of the present disclosure gives the advantage that the pressure acting on the carrier layer full bead during the engine cycles is perfectly distributed by the presence of functional layers between the full bead of the carrier layer and the stoppers. Therefore, the life goal of the gasket, and especially the life of the full bead present on the carrier layer is extended.

According to another aspect of the present disclosure, the stopper is welded to the correspondent functional layer. This aspect of the present disclosure gives the possibility of providing a stopper rigidity that may be different (and for example much higher) than the rigidity of the functional layer welded to the stopper.

A different embodiment of the present disclosure provides an internal combustion engine including a cylinder block, a cylinder head and a gasket according to any of the preceding claims interposed between the cylinder block and the cylinder head. This gives the effect of minimizing or preventing the gasses leakage from the combustion chambers of the engine, especially during the combustion phase.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 3:
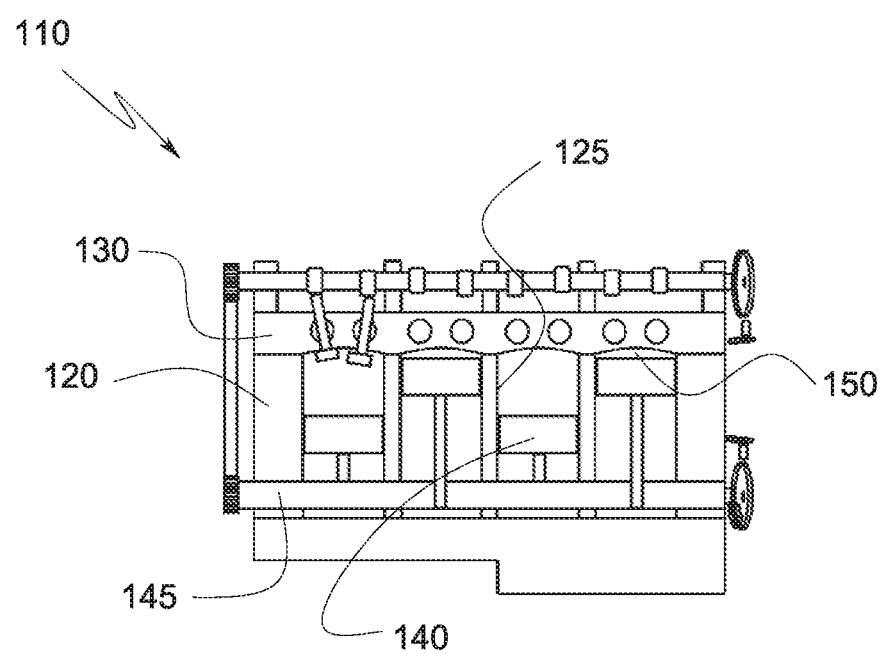
FIG. 3 is a schematic view of an engine according to the present disclosure.

Some embodiments may include an internal combustion engine (ICE, shown in FIG. 3) 110 having an engine block 120 defining at least one cylinder 125 having a piston 140 coupled to rotate a crankshaft 145. A cylinder head 130, fastened to the engine block 120, cooperates with the piston 140 and a cylinder wall to define a combustion chamber 150. A fuel and air mixture (not shown) is disposed in the combustion chamber 150 and ignited, resulting in hot expanding exhaust gasses causing reciprocal movement of the piston 140. The engine may be an engine with liners in block, presenting an aluminum engine block 124, and cast iron liners 128 defining cylinder walls.

Figure 1:
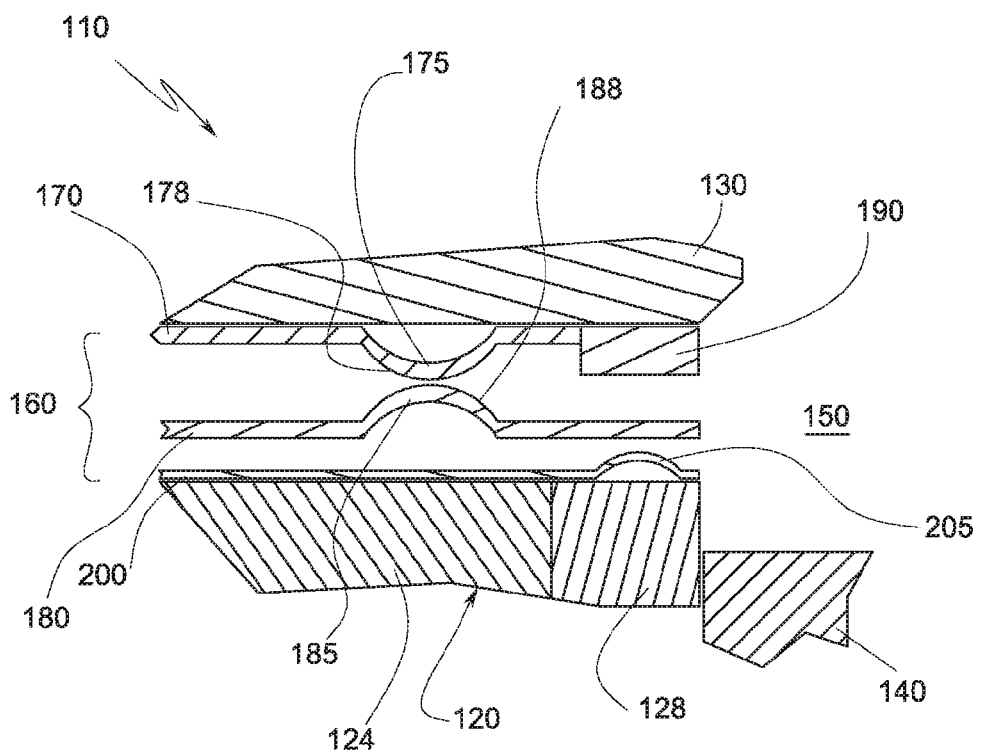
FIG. 1 is a schematic expanded section view of a first embodiment of the present disclosure.

Between the cylinder head 130 and the engine block 120, a multilayer cylinder head gasket 160 is present. In FIG. 1, the cylinder head gasket is shown in an exploded view and includes at least a first 170 and a second functional layer 180, which may be made of elastic metal and in particular spring steel. The functional layers 170, 180 are provided with a plurality of combustion-chamber holes corresponding to the combustion chambers 150 of the associated internal combustion engine. The cylinder head gasket 160 also presents fluids passages designed in correspondence of coolant cavities (both not shown) and provided between the engine block and the cylinder head.

The first functional layer 170 have an embossed, integrally formed, first full bead 175 provided for sealing purposes. The second functional layer 180 is coupled to the first layer 170 and also has an integrally formed embossed second full bead 185, again provided for sealing purposes. The first 170 and second layer 180 are mutually positioned so that a convex portion 178 of the first full bead 175 faces a convex portion 188 of the second full bead 185.

On the first layer 170 a first stopper is provided in a portion free form those full bead, because it is distant from the first full bead. It should be noticed that the stopper is provided in a region that is adjacent to the combustion chamber 150 (typically centered on cylinder liners).

The first stopper 190 acts as a static deformation limiter, and it is provided to limit the relative movement (and the proper load range) of the first layer 170 with respect to the second 180. The first stopper 190 prevents the facing full beads to become flat under the tension of the bolts provided between the cylinder head and the engine block.

As it can be noticed from FIG. 1, the gasket 160 also includes a carrier layer 200 provided with a carrier layer full bead 205. The carrier layer full bead is located in that area of the gasket adjacent to the combustion chamber 150, where the first stopper 190 is also positioned. Specifically the carrier layer full bead 205 and the first stopper 190 are mutually superimposed.

According to one aspect of the present disclosure, the carrier layer full bead is designed to have a maximum line load range included between 75 and 125 N/mm when the carrier layer full bead 205 is fully compressed. The carrier layer full bead 205 is fully compressed at maximum closure, when there is no gap between the engine block and the cylinder head. The carrier layer full bead 205 is designed to assume in these conditions a flat configuration.

In maximum gap condition, i.e. when the carrier layer full bead is at minimum load conditions, the maximum line load range of the carrier layer full bead 205 is lower than 30 N/mm. This feature of the carrier layer full bead 205 helps to avoid severe stress on the carrier layer full bead, also under the minimum load condition. Furthermore, it improves the sealing properties of the gasket, especially in that part of the gasket that is adjacent to the combustion chamber 150.

The provision of a carrier layer full bead 205 as described, provides a good sealing especially when applied to high performance small diesel engines. In those kinds of engines the maximum peak firing pressure in the combustion chamber is extremely high and a significant gap amplitude between the engine block 120 and the cylinder head 130 is unavoidable. The use of a carrier layer full bead with the described features, helps to give a seal in the combustion perimeter even when the gap is very small in the stopper line (that is that area where the stopper is positioned), because the sealing force of the bead is already high enough to grant a seal.

This provides increased sealing recovery capability, and minimizes or avoids hot gas leakage around the combustion chamber 150. It especially avoids gas to coolant leakage. Moreover, the described configuration of the gasket gives a reduced structure stiffness around the combustion chamber, especially in block open deck configuration engines.

It is to be noticed that the addition of the carrier layer full bead in the stopper line does not affect the sealing performances of the other gasket elements (functional layers full beads and stoppers) under all working condition of the beads (maximum and minimum line load).

According to another aspect of the present disclosure, the second layer 180 is free from any stopper, and it is positioned between the first layer 170 having the stopper 190 and the carrier layer 200.

The second layer 180, interposed between the stopper 190 and the carrier layer full bead 205, protects the carrier layer full bead 205 from the direct pressure of the stopper 190 during the different phases of the relative cylinder working cycle, giving a more homogeneous load distribution on the carrier layer full bead 205. The second layer helps to distribute the load on a bigger surface area, therefore diminishing the specific load on the carrier layer full bead surface. This improves the life of the carrier layer full bead reducing the dynamic stress of this component, thus making the life of the gasket longer.

In the described embodiment, the stopper is welded to the first functional layer. In this way, it is possible to provide a stopper with a rigidity that is different, and in this case much higher, than the rigidity of the first functional layer. The stopper gives a protection of the full beads limiting the maximum load for the first and second functional layer. The second functional layer interposed between the stopper and the carrier layer full bead reduces the maximum line load on the carrier layer full bead 205.

Figure 2:
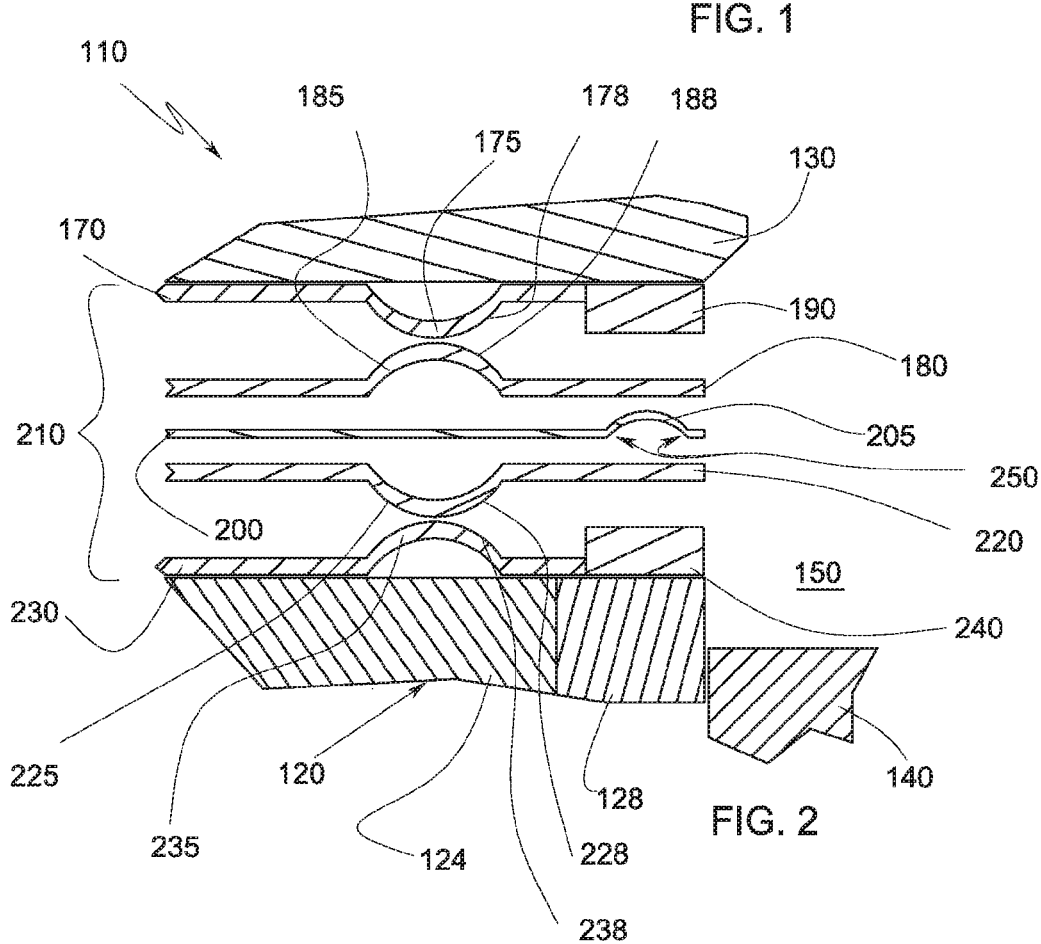
FIG. 2 is a schematic expanded section view of a second embodiment of the present disclosure.

A different embodiment is shown in FIG. 2. Here the cylinder head gasket 210 includes in at least five layers. The first three layers 170, 180, 200 adjacent to the cylinder head are realized exactly as already described above. Therefore their description will not be repeated and the same reference numbers will be used to identify parts that correspond to those already described.

The cylinder head gasket 210, in addition to the ones already described, includes a third functional layer 220, having an embossed third full bead 225. It further includes a fourth functional layer 230 having an embossed fourth full bead 235. The third and fourth functional layers 220,230 are mutually positioned so that a convex portion 228 of the third full bead 225 faces a convex portion 238 of the fourth full bead 235. It is to be noted that the fourth layer 230 is provided with a second stopper 240 placed in that area of the gasket where the first stopper 190 is also positioned. The second stopper 240 may be also welded to the fourth layer 230, and it presents the same features of the first stopper 190. The second stopper 240 may also be made of the same rigidity of the first one, and it is concentric and aligned with the first stopper 190.

As shown in FIG. 2, the third layer 220 is free from any stopper and it is interposed between the carrier layer 200 and the fourth layer 230. This embodiment gives a better seal because four full beads are provided. Moreover the carrier layer 200, having the carrier layer full bead 205, it is sandwiched between the second 180 and the third layer 220 that are both free from stoppers. The carrier layer full bead 205 is therefore protected both on its convex side and on its concave side.

The protection conferred by the second layer 180, as explained above, works on the carrier layer full bead in substantially the same way. The third layer instead protects the carrier layer full bead 205 from the second stopper 240. This solution distributes in a more homogeneous way the load of the first and second stopper 190, 240 on the carrier layer full bead 205, and reduces the dynamic stress on it. Therefore in this embodiment a long life of the gasket is combined with a good seal, both in the region of the full beads on the functional layers, and in the stopper area (stopper line) adjacent to the combustion chamber, because of the carrier layer full bead.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A cylinder head gasket for sealing an interface between an engine block and a cylinder head having a cylinder wall, the cylinder head gasket comprising a stack of layers including: a first functional layer having an embossed first sealing full bead and a first stopper provided in a region adjacent to the cylinder wall; a second functional layer having an embossed second sealing full bead, wherein the first sealing full bead is directly facing and directly contacting the second sealing full bead; and a carrier layer having an embossed carrier layer full bead facing the first stopper, wherein the carrier layer full bead has a maximum line load in a range comprised between 75 and 125 N/mm and assumes a flat configuration when fully compressed.

2. The gasket according to claim 1, wherein the embossed first sealing full bead includes a first convex portion directly facing and directly contacting a second convex portion of the second sealing full bead.

3. The gasket according to claim 1, wherein the embossed carrier layer full bead has a maximum line load range lower than 30 N/mm at minimum load conditions.

4. The gasket according to claim 1, wherein the second functional layer is positioned between said first functional layer having the stopper and said carrier layer.

5. The gasket according to claim 4, wherein the second functional layer is free from any stoppers.

6. The gasket according to claim 1, wherein the superimposed layers further comprise: a third functional layer including an embossed third sealing full bead; and a fourth functional layer including an embossed fourth sealing full bead and a second stopper provided in a region adjacent to the cylinder wall; wherein the third and fourth functional layers are positioned so that the embossed third sealing full bead is directly facing and directly contacting the embossed fourth sealing full bead and the second stopper faces the first stopper.

7. The gasket according to claim 6, wherein the third functional layer is positioned between said carrier layer and said fourth functional layer.

8. The gasket according to claim 7, wherein the third functional layer is free from any stoppers.

9. The gasket according to claim 6, wherein the first stopper is welded to the first functional layer and the second stopper is welded to the fourth functional layer.

10. The gasket according to claim 1, wherein the first stopper is welded to the first functional layer.

11. An internal combustion engine comprising: a cylinder block; a cylinder head having a cylinder wall; and a gasket interposed between the cylinder block and the cylinder head, the gasket comprising a stack of layers including: a first functional layer having an embossed first sealing full bead and a first stopper provided in a region adjacent to the cylinder wall; a second functional layer having an embossed second sealing full bead, wherein the embossed first sealing full bead is directly facing and directly contacting the embossed second sealing full bead; and a carrier layer having an embossed carrier layer full bead facing the first stopper, wherein the embossed carrier layer full bead has a maximum line load in a range comprised between 75 and 125 N/mm and assumes a flat configuration when fully compressed.

* * * * *